US010948806B2

(12) United States Patent
Yamasaki (10) Patent No.: US 10,948,806 B2
(45) Date of Patent: Mar. 16, 2021

(54) IMAGE CAPTURING DEVICE (71) Applicant: Panasonic Intellectual Property Management Co., Ltd., Osaka (JP)

(72) Inventor: Takaaki Yamasaki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 109 days.

(21) Appl. No.: 16/280,746

(22) Filed: Feb. 20, 2019

(65) Prior Publication Data

US 2019/0353988 A1 Nov. 21, 2019

(30) Foreign Application Priority Data

May 17, 2018 (JP) .............................. JP2018-095671
Feb. 6, 2019 (JP) .............................. JP2019-019579

(51) Int. Cl.
*G02B 7/02* (2021.01)
*G03B 17/14* (2021.01)
(Continued)

(52) U.S. Cl.
CPC .............. *G03B 17/14* (2013.01); *G02B 7/09* (2013.01); *G03B 13/36* (2013.01); *H04N 5/232933* (2018.08)

(58) Field of Classification Search
CPC .. G03B 17/14; G03B 13/36; H04N 5/232933; G02B 7/09
(Continued)

(56) References Cited

U.S. PATENT DOCUMENTS

2004/0263913 A1* 12/2004 Masato .............. H04N 1/00129
358/302
2009/0051807 A1 2/2009 Kunishige
(Continued)

FOREIGN PATENT DOCUMENTS

JP 2011149971 A * 8/2011
JP 2016-191908 A 11/2016
WO 2009/139193 A 11/2009

OTHER PUBLICATIONS

Extended European Search Report for corresponding application No. 19157741.0 dated May 8, 2019.

*Primary Examiner* — William Choi
(74) *Attorney, Agent, or Firm* — Renner, Otto, Boisselle & Sklar, LLP (57) ABSTRACT

An image capturing device on which an interchangeable lens is mountable, the interchangeable lens including an optical axis direction position adjustment lens and an operation member to drive the optical axis direction position adjustment lens. The image capturing device includes an acquisition unit that acquires an operation instruction made by a user, and a controller that controls operation of the image capturing device. The controller has a manual mode in which a position of the optical axis direction position adjustment lens is adjusted in accordance with operation of the operation member and an automatic mode. The controller sets a lock function enabled or disabled in accordance with the operation instruction acquired by the acquisition unit, the lock function being configured to prevent the optical axis direction position adjustment lens from being driven even when the user operates the operation member in the manual mode.

9 Claims, 5 Drawing Sheets

(51) Int. Cl.
 *H04N 5/232* (2006.01)
 *G02B 7/09* (2021.01)
 *G03B 13/36* (2021.01)

(58) Field of Classification Search
 USPC ...... 359/676, 683, 822–824; 396/72, 77, 83, 396/88
 See application file for complete search history.

(56) References Cited

U.S. PATENT DOCUMENTS

2009/0284612 A1 11/2009 Abe
2011/0176795 A1 7/2011 Won
2016/0291287 A1 10/2016 Kishida \* cited by examiner

IMAGE CAPTURING DEVICE

BACKGROUND OF THE INVENTION

Field of the Invention

The present disclosure relates to an image capturing device that allows a manual adjustment of an in-focus state or a zoom state via operation of an operation member for an optical axis direction position adjustment lens such as a focus lens or a zoom lens.

Description of the Related Art

The image capturing device includes an optical axis direction position adjustment lens capable of adjusting a position in the optical axis direction. Adjusting the position in the optical axis direction causes the focus state or zoom state to be adjusted. Further, there is an image capturing device including a focus ring as an operation member for manually operating a focus lens that is an optical axis direction position adjustment lens. For example, JP 2016-191908 A discloses an image capturing device including a focus lens for adjusting an in-focus state on a subject, an operation unit (focus ring) for receiving operation made by a user, and a drive unit for driving the focus lens based on the operation of the operation unit. The drive unit drives the focus lens such that an operation amount of the operation unit when moving the focus position by a unit distance is constant irrespective of a subject distance.

SUMMARY OF THE INVENTION

When the focus ring is accidentally operated or unintentionally touched after the focus ring is operated to achieve a desired in-focus state in the image capturing device, the position of the focus lens is changed. This requires another adjustment to the desired in-focus state, which becomes a burden on a user.

The present disclosure provides an image capturing device capable of preventing a change in position of an optical axis direction position adjustment lens due to unintentional operation of an operation member such as erroneous operation after a position adjustment of the optical axis direction position adjustment lens.

According to one aspect of the present disclosure, provided is an image capturing device on which an interchangeable lens is mountable, the interchangeable lens including an optical axis direction position adjustment lens and an operation member to be operated by a user to drive the optical axis direction position adjustment lens. The image capturing device includes an acquisition unit that acquires an operation instruction corresponding to setting operation made by the user and a controller that controls operation of the image capturing device. The controller has a manual mode in which a position of the optical axis direction position adjustment lens is adjusted in accordance with operation of the operation member and an automatic mode in which the position of the optical axis direction position adjustment lens is automatically adjusted. The controller sets a lock function enabled or disabled in accordance with the operation instruction from the user acquired by the acquisition unit, the lock function being configured to prevent the optical axis direction position adjustment lens from being driven even when the user operates the operation member in the manual mode.

According to the image capturing device of the present disclosure, it is possible to set the operation of the operation member (for example, the focus ring) disabled in the manual mode. Accordingly, in the manual mode, when it is desired to temporarily fix the lens position after adjusting the lens position in the optical axis direction (focus position or zoom position), setting the operation of the operation member disabled makes it possible to prevent a change in position of the lens due to unintentional motion of the operation member caused by, for example, erroneous operation.

BRIEF DESCRIPTION OF THE DRAWINGS

FIG. 5 is a diagram showing an example of an icon indicating that the focus ring lock function is set to ON.

DESCRIPTION OF THE PREFERRED EMBODIMENTS

Embodiments will be described in detail below with appropriate reference to the drawings. However, a detailed description more than necessary may be omitted. For example, a detailed description of a well-known matter and a redundant description on substantially the same structure may be omitted. This is to avoid the following description being unnecessarily redundant and to help those skilled in the art to easily understand the following description.

Note that the inventors et al. provide the accompanying drawings and the following description to help those skilled in the art to fully understand the present disclosure, and do not intend to use the accompanying drawings and the following description to limit the subject matter of the claims.

First Embodiment

[1-1. Configuration]

A digital camera according to a first embodiment will be described with a focus lens taken as an example of an optical axis direction position adjustment lens. Note that examples of the optical axis direction position adjustment lens include a zoom lens in addition to the focus lens. Accordingly, the first embodiment described below is also applicable to a zoom lens. The digital camera according to the first embodiment has a manual focus mode (hereinafter, referred to as "MF mode") in which a user manually moves the focus lens to adjust the focus, and an auto focus mode (hereinafter, referred to as "AF mode") in which the digital camera automatically moves the focus lens to an in-focus position to adjust the focus.

Figure 1:
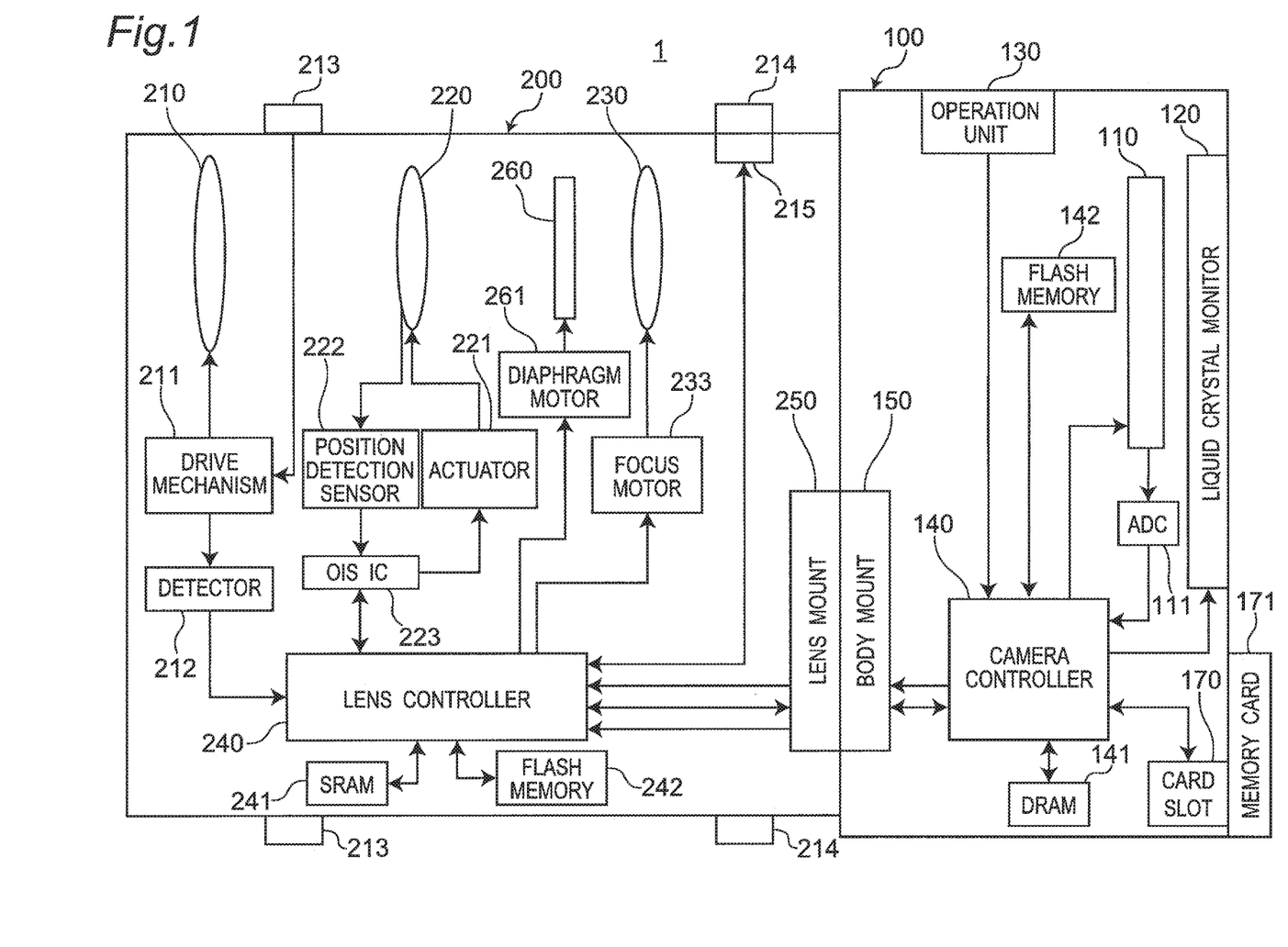
FIG. 1 is a diagram showing a configuration of a digital camera according to a first embodiment of the present disclosure.

FIG. 1 is a diagram showing a configuration of the digital camera according to the first embodiment. As shown in FIG. 1, a digital camera 1 includes a camera body 100 and an interchangeable lens 200. The interchangeable lens 200 is provided with a focus ring 214 to be used by the user to make focus operation. The MF mode allows the user to manually make focusing operation by rotating the focus ring 214. More detailed configurations of the camera body 100 and the interchangeable lens 200 will be described below.

[1-1-1. Camera Body]

The camera body 100 includes a CMOS image sensor 110, a liquid crystal monitor 120, a camera controller 140, a body mount 150, and a card slot 170.

The camera controller 140 controls overall operation of the digital camera 1 including control of the CMOS image sensor 110 and the like in accordance with an instruction from a release button. The camera controller 140 uses a DRAM 141 as a work memory during control operation or image processing operation. The camera controller 140 is an example of a controller.

The CMOS image sensor 110 is an image sensor that captures a subject image incident through the interchangeable lens 200 to generate an analog image signal. The analog image signal thus generated is converted into digital image data by an AD converter (ADC) 111. The image data that is a result of the conversion made by the AD converter 111 is subjected to various kinds of image processing in the camera controller 140. Examples of the various kinds of image processing include gamma correction processing, white balance correction processing, flaw correction processing, YC conversion processing, electronic zoom processing, image compression processing such as JPEG compression processing, and the like.

The CMOS image sensor 110 operates in synchronization with a timing generated by the camera controller 140. The CMOS image sensor 110 captures a still image or a moving image, a through-the-lens image, or the like. The through-the-lens image is an image that is captured but is not recorded into a memory card 171. The through-the-lens image is typically a moving image that is displayed on the liquid crystal monitor 120 and is checked by the user to determine composition of a captured image.

The liquid crystal monitor 120 displays an image represented by display image data that is a result of image processing performed by the camera controller 140. The liquid crystal monitor 120 is capable of selectively displaying a moving image and a still image. Instead of the liquid crystal monitor 120, a different type of display device such as an organic EL display may be used.

The operation unit 130 includes an operation member to be used by the user to provide an instruction to or make a setting of the digital camera 1. For example, the operation unit 130 includes the release button, a cursor key, a jog dial, a mode dial, a touch panel, and the like.

The card slot 170 detachably accepts the memory card 171. The card slot 170 controls the memory card 171 under the control of the camera controller 140. That is, the image data generated through the image processing performed by the camera controller 140 is stored in the memory card 171. In the memory card 171, various image files such as JPEG image file can be stored. Further, the image data or image file stored in the memory card 171 can be read therefrom. The image data or image file read from the memory card 171 is subjected to image processing performed by the camera controller 140. For example, the camera controller 140 decompresses the image data or image file acquired from the memory card 171 to generate the display image data.

The body mount 150 is mechanically and electrically connectable with a lens mount 250 of the interchangeable lens 200. The body mount 150 is capable of transmitting and receiving data to and from the interchangeable lens 200 via the lens mount 250.

Note that the camera body 100 is provided with a mode selector switch (not shown) for switching the setting of the digital camera 1 between the auto focus (AF) mode and the manual focus (MF). The mode selector switch outputs a switching signal to the camera controller 140 in response to user's operation. The camera controller 140 transmits, to a lens controller 240, a control signal for enabling a focus mode in accordance with the switching signal. This allows the setting of the digital camera 1 to be switched between the AF mode and the MF mode.

[1-1-2. Interchangeable Lens]

The interchangeable lens 200 includes an optical system, the lens controller 240, and the lens mount 250. The optical system of the interchangeable lens 200 includes a zoom lens 210, an OIS lens 220, a diaphragm 260, and a focus lens 230.

The zoom lens 210 is a lens for changing the magnification of the subject image formed by the optical system of the interchangeable lens 200. The zoom lens 210 is composed of one or a plurality of lenses. A drive mechanism 211 is a mechanism that moves the zoom lens 210 in mechanical conjunction with motion of the zoom ring 213 that is a user-rotatable zoom ring. The drive mechanism 211 moves the zoom lens 210 along an optical axis direction of the optical system based on the operation of the zoom ring 213 made by the user.

A first detector 212 detects motion or a driven amount of the zoom lens made by the drive mechanism 211. Further, the first detector 212 detects a position of the zoom ring 213, that is, a position of the zoom lens 210. The lens controller 240 is capable of acquiring a detection result from the first detector 212 to grasp a zoom magnification, the position of the zoom lens 210, and the position, rotation amount, and rotation speed of the zoom ring 213 in the optical system.

The OIS lens 220 is a lens for correcting blurring of the subject image formed by the optical system of the interchangeable lens 200. The OIS lens 220 moves in a direction to cancel a shake of the digital camera 1, thereby reducing the blurring of the subject image on the CMOS image sensor 110. The OIS lens 220 is composed of one or a plurality of lenses. Under the control of an OIS IC 223, an actuator 221 drives the OIS lens 220 in a plane perpendicular to the optical axis of the optical system. A position detection sensor 222 is a sensor that detects the position of the OIS lens 220 in the plane perpendicular to the optical axis of the optical system. The OIS IC 223 controls the actuator 221 based on a detection result from the position detection sensor 222 and a detection result from a shake detector such as a gyro sensor.

The diaphragm 260 is a member for adjusting an amount of light passing through the optical system. The diaphragm 260 is composed of, for example, a plurality of diaphragm blades, and is capable of adjusting the amount of light by opening or closing an aperture formed by the blades.

The focus lens 230 is a lens for changing a focus state of the subject image formed on the CMOS image sensor 110 by the optical system. The focus lens 230 is composed of one or a plurality of lenses.

Under the control of the lens controller 240, a focus motor 233 drives the focus lens 230 to move forward or backward along the optical axis of the optical system. This allows a change in the focus state of the subject image formed on the CMOS image sensor 110 by the optical system. In the present embodiment, a stepping motor is used as the focus motor 233. Note that the focus motor is not limited to such a stepping motor and may be a DC motor or an ultrasonic motor, for example.

The focus ring 214 is an operation member that is provided on an exterior of the interchangeable lens 200 and receives operation (instruction) for moving the focus lens 230 from the user.

A second detector 215 detects an operation amount (rotation amount) of the focus ring 214 when the focus ring 214 is operated by the user. The second detector 215 includes a photo interrupter, and causes the photo interrupter to detect the operation amount of the focus ring 214 and output an operation signal (pulse signal) indicating the operation amount thus detected to the lens controller 240. Instead of the photo interrupter, the second detector 215 may include a sliding resistor that detects the operation amount of the focus ring 214.

The lens controller 240 controls a whole of the interchangeable lens 200 including control of the OIS IC 223 and the focus motor 233, based on a control signal from the camera controller 140. For example, in the AF mode, the lens controller 240 controls the focus motor 233 to move the focus lens 230 forward or backward along the optical axis by a predetermined driving method based on the control signal from the camera controller 140 (wobbling control). On the other hand, in the MF mode, the lens controller 240 moves the focus lens 230 in accordance with the operation of the focus ring 214 made by the user, that is, a detection signal from the second detector 215.

Further, the lens controller 240 receives signals from the first and second detectors 212, 215, the OIS IC 223, and the like and then transmits the signals to the camera controller 140. The lens controller 240 transmits and receives data to and from the camera controller 140 via the lens mount 250 and the body mount 150.

The lens controller 240 uses an SRAM 241 as a work memory. Further, a flash memory 242 stores programs and parameters used for controlling the lens controller 240.

The camera controller 140 and the lens controller 240 each run a program to perform a predetermined function. Here, the program to be run may be provided to the digital camera 1 via a recording medium such as a DVD-ROM or a CD-ROM, or may be downloaded from a server on a network via a communication line. Further, although the respective functions of the camera controller 140 and the lens controller 240 are each performed by a cooperation of hardware and software (application program), each function may be performed only by a hardware circuit specifically designed to perform the predetermined function. The camera controller 140 and the lens controller 240 may be each constituted not only by a CPU or an MPU, but also a DSP, an FPGA, an ASIC, or the like.

[1-2. Operation]

The operation of the focus ring of the digital camera 1 configured as described above will be described.

In the digital camera 1 of the present embodiment, in the manual focus (MF) mode, the focus lens 230 moves in accordance with to the operation of the focus ring 214 made by the user to cause a change in the in-focus state. Specifically, in the MF mode, when the focus ring 214 is operated, the second detector 215 detects the operation amount of the focus ring 214 and transmits information indicating the operation amount thus detected to the lens controller 240.

The lens controller 240 controls the focus motor 233 to move the focus lens 230 by a travel amount corresponding to the operation amount. This causes the focus lens 230 to move in accordance with the operation amount of the focus ring 214.

As described above, in the MF mode, the focus lens 230 is driven in accordance with the operation of the focus ring 214, which allows the user to manually adjust the focus. In this case, however, the following problem will arise.

For example, in astrophotography, the user takes time to operate the focus ring 214 to adjust the in-focus state. In this case, when the user accidentally touches the focus ring 214 after adjusting to the in-focus state, the focus lens 230 is unintentionally moved, which results in a change in the in-focus state. This requires the user to take time again to adjust to the in-focus state, which becomes a big burden on the user. Alternatively, there is a case where the digital camera is fixed in a state where a desired position is brought into focus in advance, and an image of a subject (for example, a train) passing through the position is taken. In this case also, when the user accidentally touches the focus ring 214 after focusing, the focus lens 230 is unintentionally moved, which results in a change in the in-focus state. This also requires the user to take time again to adjust to the in-focus state, which puts a burden on the user.

In order to solve the problem, the digital camera 1 of the present embodiment is provided with a focus ring lock function capable of setting the operation of the focus ring 214 enabled or disabled in the MF mode. In other words, the focus ring lock function is a function of preventing the focus lens 230 from being driven even when the focus ring 214 is operated in the MF mode.

Figure 2:
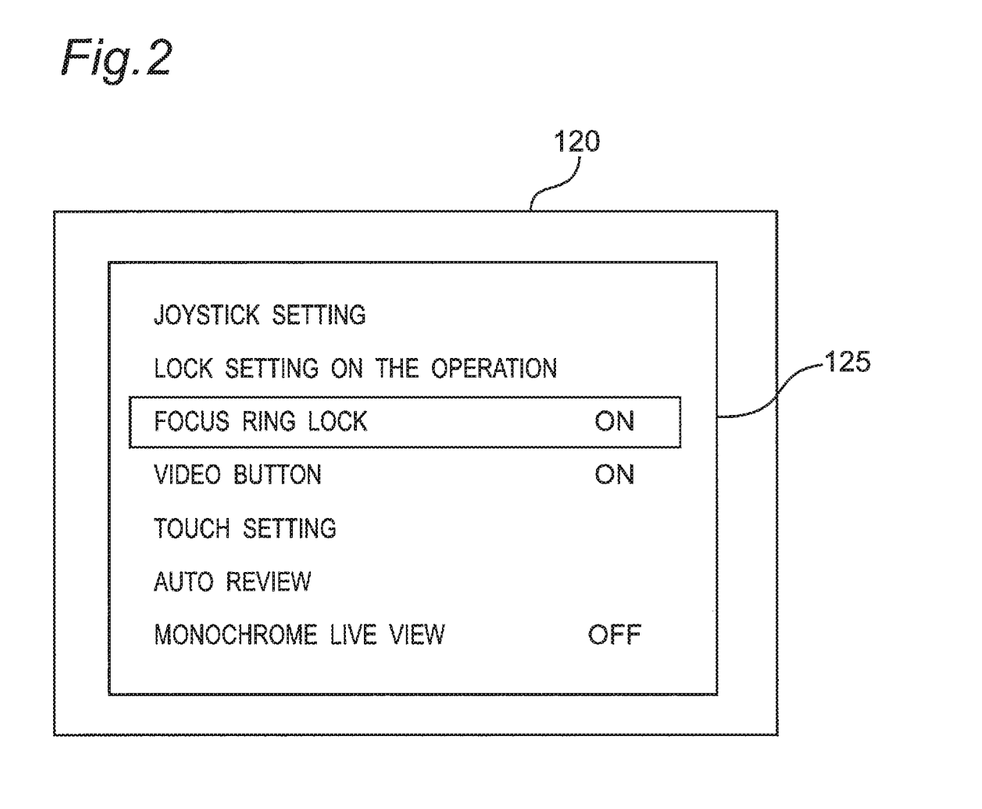
FIG. 2 is a diagram showing an example of a menu screen for setting a focus ring lock function (disabling focus ring operation in a manual focus mode).

FIG. 2 is a diagram showing an example of a menu screen for setting the focus ring lock function enabled or disabled. This menu screen 125 is displayed on the liquid crystal monitor 120. The user can set each item on the menu screen 125 by operating the operation unit 130 such as a touch panel function, a cursor key, or a dial. When an item "Focus ring lock" is set to "ON" on this menu screen 125, the focus ring lock function is set enabled (ON). When the item "Focus ring lock" is set to "OFF", the focus ring lock function is set disabled (OFF).

With the focus ring lock function set enabled, the focus lens 230 is not driven even when the user operates the focus ring 214 in the MF mode. That is, the focus ring operation is set disabled. On the other hand, with the focus ring lock function set disabled, when the user operates the focus ring 214 in the MF mode, the focus lens 230 is driven in response to the operation of the focus ring 214. That is, the focus ring operation is set enabled.

Figure 3:
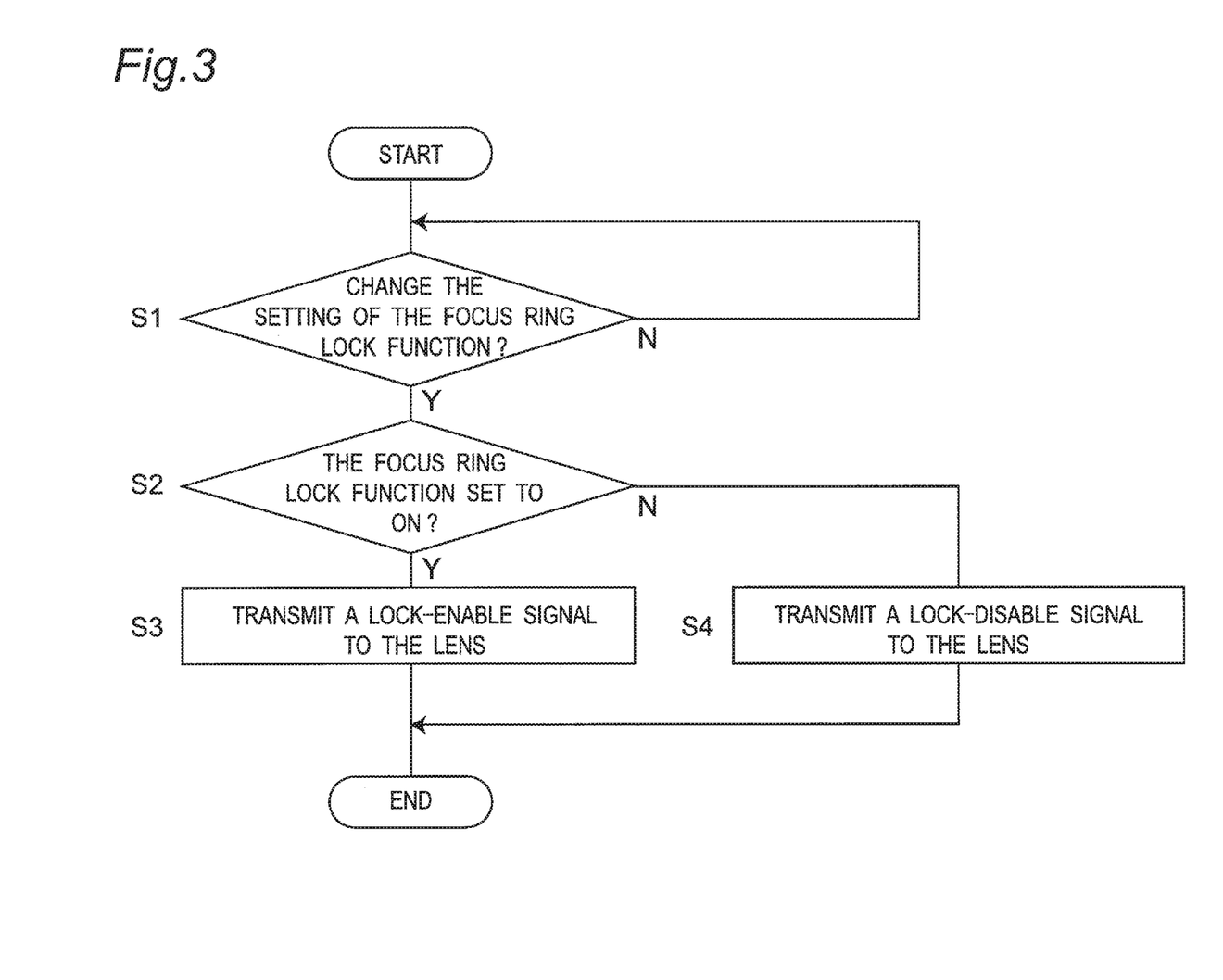
FIG. 3 is a flowchart showing processing of a camera controller performed when the setting of the focus ring lock function is changed on the menu screen.

FIG. 3 is a flowchart showing processing performed when the setting of the focus ring lock function is changed. The processing of the flowchart of FIG. 3 will be described below.

When the setting of the focus ring lock function is changed on the menu screen 125 (YES in S1) and the focus ring lock function is set to "ON" (YES in S2), the camera controller 140 transmits, to the lens controller 240, a lock-enable signal for setting the focus ring lock function to ON (S3). Upon receiving the lock-enable signal, the lens controller 240 sets the focus ring lock function in the interchangeable lens 200 to ON. This disables the operation of the focus ring 214 in the MF mode.

On the other hand, when the focus ring lock function is set to "OFF" (NO in S2), the camera controller 140 transmits, to the lens controller 240, a lock-disable signal for setting the focus ring lock function to OFF (S4). Upon receiving the lock-disable signal, the lens controller 240 sets the focus ring lock function in the interchangeable lens 200 to OFF. This enables the operation of the focus ring 214 in the MF mode.

Figure 4:
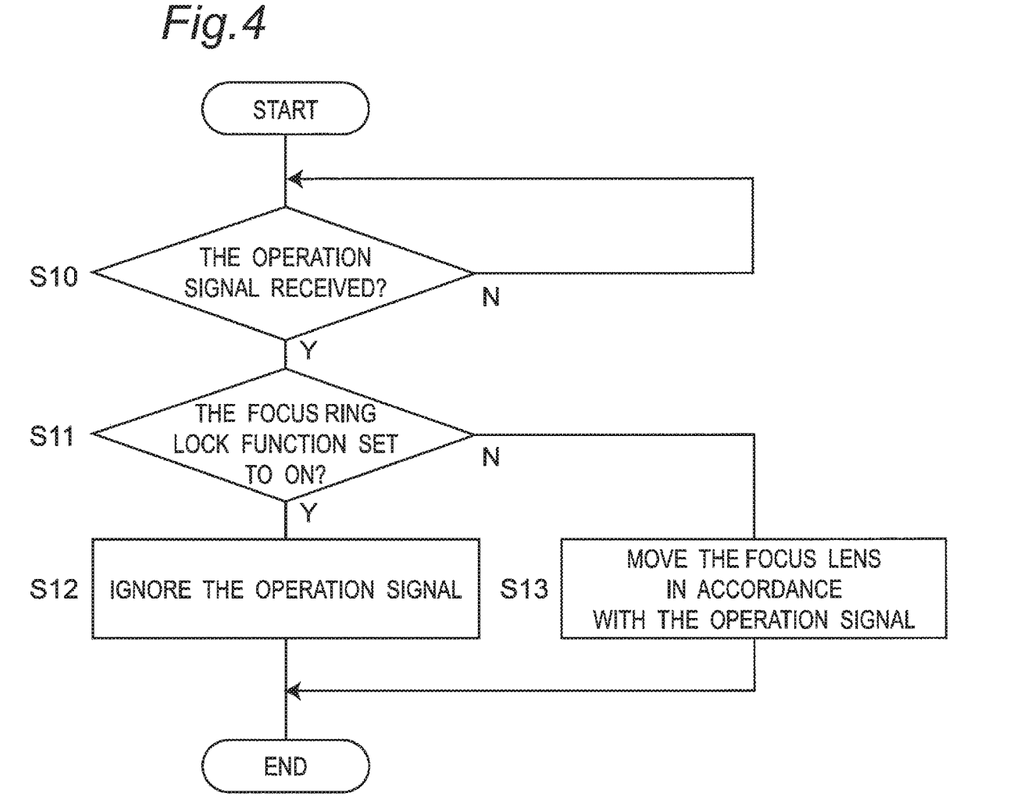
FIG. 4 is a flowchart showing processing of a lens controller performed when the focus ring operation is made in the manual focus mode.

FIG. 4 is a flowchart showing processing of the lens controller 240 performed when the focus ring operation is made in the MF mode. The processing of the flowchart of FIG. 4 will be described below.

In the MF mode, when the user intentionally or unintentionally operates the focus ring 214 to rotate the focus ring 214, the second detector 215 transmits, to the lens controller 240, an operation signal indicating the operation amount of the focus ring 214.

Upon receiving the operation signal from the second detector 215 (YES in S10), the lens controller 240 determines whether or not the focus ring lock function is set to ON in the interchangeable lens 200, that is, the focus ring operation is set disabled (S11). When the focus ring lock function is set to ON (that is, the focus ring operation is disabled) (YES in S11), the lens controller 240 ignores the operation signal from the second detector 215 (S12). This prevents, even when the focus ring operation is made, the focus lens 230 from being driven.

On the other hand, when the focus ring lock function is not set to ON in the interchangeable lens 200, that is, when the focus ring operation is not set disabled (NO in S11), the lens controller 240 controls the focus motor 233 to move the focus lens 230 in accordance with the operation signal output from the second detector 215 (S13). This causes the focus lens 230 to be driven in accordance with the operation amount of the focus ring 214.

As described above, with the focus ring lock function set to ON, even when the focus ring 214 rotates in the MF mode, the focus lens 230 is not driven, which results in no change in the in-focus state.

Note that, in the example, ignoring the operation signal from the second detector 215 in the MF mode disables the focus ring operation. Instead of this method, a different method may be employed in which, when the focus ring lock function is set to ON, power to the second detector 215 (that is, the photo interrupter) is cut off, thereby making it unable to detect the focus ring operation and accordingly disable the focus ring operation. That is, when the focus ring lock function is set to ON, the power to the second detector 215 (that is, the photo interrupter) is cut off in the MF mode. This also makes it possible to disable the focus ring operation.

Figure 5:
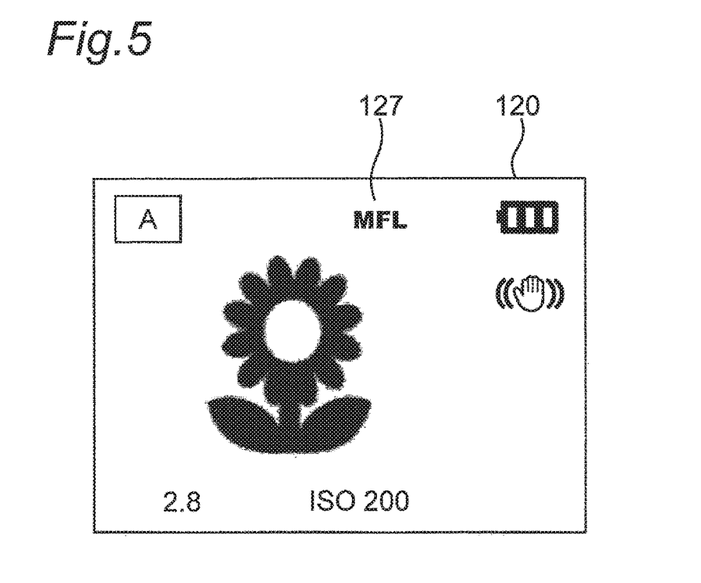

Further, in the MF mode, when the focus ring lock function is set to ON, a display (icon, mark, text, or the like) indicating that the focus ring lock function is ON may be displayed on the liquid crystal monitor 120. For example, when the focus ring lock function is set to ON, an icon 127 (MFL: Manual Focus, Lock) as shown in FIG. 5 may be displayed. This display allows the user to recognize that the focus ring operation is set disabled.

Further, in a configuration where the focus lens position is reset to an initial position when the digital camera 1 is turned off, when the digital camera 1 is turned off with the focus ring lock function set to ON, the position of the focus lens 230 just before the turning off of the digital camera 1 may be stored in the flash memory 142. When the digital camera 1 is subsequently turned on, the camera controller 140 may read the previous focus lens position from the flash memory 142 at startup of the digital camera 1 and move the focus lens 230 to the position.

[1-3. Effects and Others]

As described above, either the digital camera 1 or the camera body 100 according to the present embodiment is an image capturing device on which the interchangeable lens 200 is mountable, the interchangeable lens 200 including the focus lens 230 and the focus ring 214 to be operated by the user to drive the focus lens 230. The digital camera 1 or the camera body 100 includes the operation unit 130 on which the user makes setting operation and the camera controller 140 that controls the operation of the digital camera 1. The camera controller 140 has the MF mode in which the focus is adjusted in accordance with the operation of the focus ring 214 and the AF mode in which the focus is automatically adjusted. The camera controller 140 sets, in accordance with the user setting made on the operation unit 130, the focus lock function enabled (ON) or disabled (OFF), the focus lock function being configured to prevent the focus lens 230 from being driven even when the user operates the focus ring 214 in the MF mode.

According to the digital camera, setting the focus lock function enabled (ON) in a desired in-focus state in the MF mode prevents the focus lens 230 from moving even when the focus ring 214 moves against the intention of the user. This makes it possible to prevent a change in the in-focus state and maintain the desired in-focus state.

Second Embodiment

Figure 6:
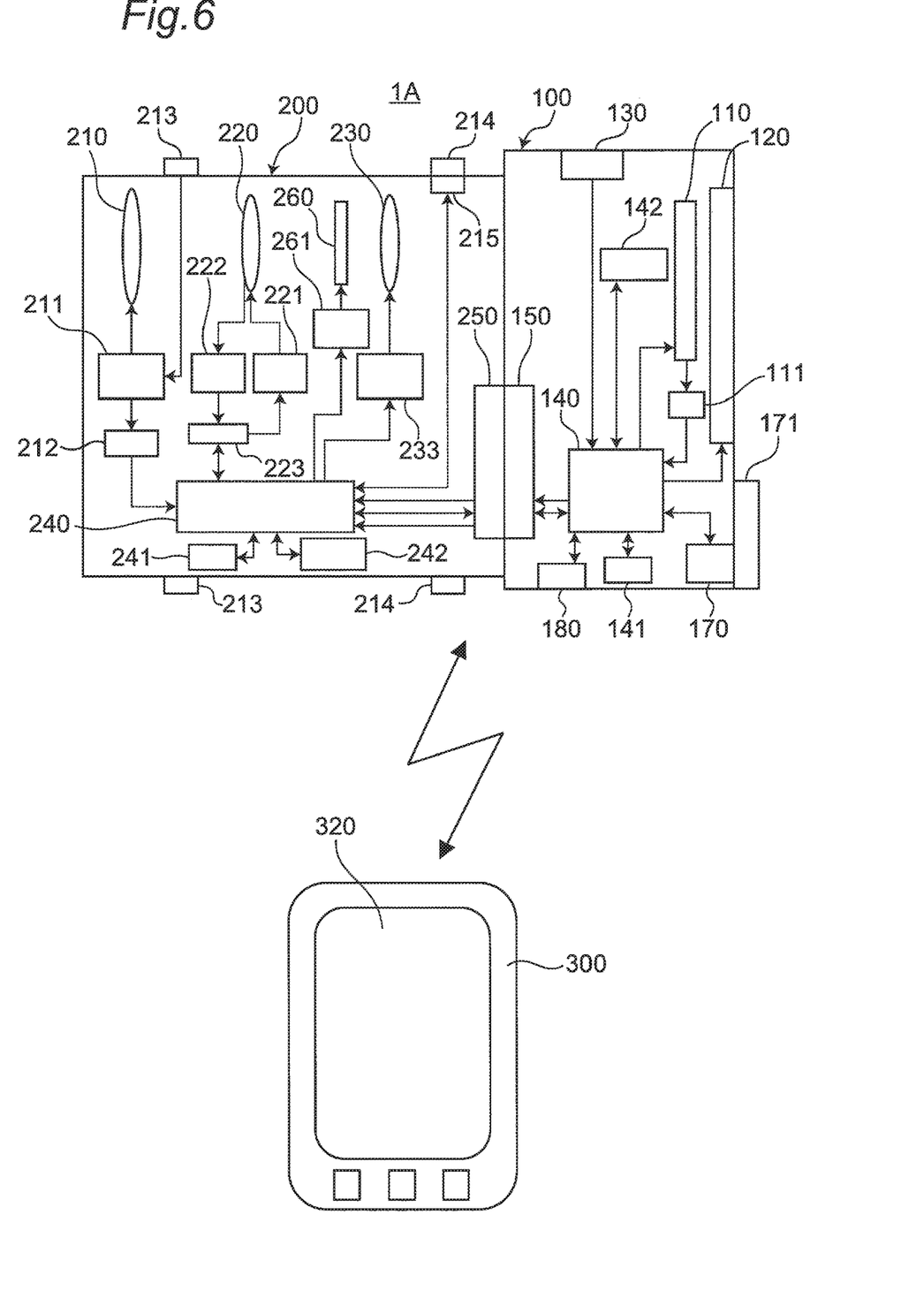
FIG. 6 is a diagram showing a configuration of a digital camera according to a second embodiment of the present disclosure.

Next, a digital camera 1A according to a second embodiment will be described with reference to FIG. 6. FIG. 6 is a diagram showing a configuration of the digital camera 1A according to the second embodiment of the present disclosure.

The digital camera 1A according to the second embodiment differs from the digital camera 1 according to the first embodiment in that the digital camera 1A according to the second embodiment is capable of setting the focus lock function to ON or OFF in accordance with an operation instruction from a mobile terminal 300 instead of or in addition to the operation instruction from the operation unit 130. Therefore, the digital camera 1A according to the second embodiment is identical to the digital camera 1 according to the first embodiment in all respects other than the respects described above and below.

The mobile terminal 300 is, for example, a smartphone. In the mobile terminal 300, an application for operating the digital camera 1A has been downloaded. Once this application is launched, it becomes possible to operate the digital camera 1A from the mobile terminal 300. The mobile terminal 300 is capable of providing an instruction to or making a setting of the digital camera 1A in the same manner as in the operation unit 130. Note that the digital camera 1A may be remotely operated by a remote controller instead of the mobile terminal 300. The operation signal from the remote controller by the user's operation is received by a communication unit 180.

The digital camera 1A includes the communication unit 180 that receives the operation signal from the mobile terminal 300. An operation signal received by the communication unit 180 is transmitted to the camera controller 140. Further, information transmitted to the liquid crystal monitor 120 is transmitted to the mobile terminal 300 via the communication unit 180. For example, Wi-Fi (registered trademark), Bluetooth (registered trademark), Bluetooth Low Energy (BLE), or the like may be used as a communication standard between the communication unit 180 and the mobile terminal 300.

The menu screen 125 is displayed on a liquid crystal monitor 320 of the mobile terminal 300 as in the first embodiment. The user can set each item on the menu screen 125 by operating a touch panel function, a button, or the like.

When the item "Focus ring lock" is set to "ON" on this menu screen 125, the focus ring lock function is set enabled (ON). When the item "Focus ring lock" is set to "OFF", the focus ring lock function is set disabled (OFF).

An operation signal indicating the setting of the focus ring lock function made in the mobile terminal 300 is transmitted to the lens controller 240 via both the communication unit 180 and the camera controller 140.

Operating the digital camera 1A remotely from the mobile terminal 300 makes it possible to make the lock setting on the operation of the focus ring 214 in the MF mode without touching the camera body 100. The camera controller 140 sets, in accordance with the user setting made on the operation unit 130, the focus lock function enabled (ON) or disabled (OFF), the focus lock function being configured to prevent the focus lens 230 from being driven even when the user operates the focus ring 214 in the MF mode. This makes it possible to reduce the occurrence of sound or vibration caused by the lock operation, as compared with the case where the lock setting is made via the operation of a member of the camera body 100.

Since the lock setting of the focus lens 230 is made electrically or via software, the occurrence of sound or vibration in the camera body 100 is reduced as compared with the case where the lock setting is made via the operation of an operation member attached to the interchangeable lens 200 or the camera body 100. This is effective particularly when the lock setting is made during capture of a movie image. It is possible to prevent sound caused by the lock setting from being recorded and prevent the occurrence of blurring of the moving image to be captured.

Other Embodiments

As described above, the first and second embodiments have been described as examples of the technique disclosed in the present application. However, the technique according to the present disclosure is not limited to the embodiments and is applicable to embodiments in which changes, replacements, additions, omissions, or the like are made as appropriate. Further, it is also possible to combine the respective components described in the first and second embodiments to form a new embodiment. In light of this, other embodiments will be exemplified.

In the above embodiments, in the MF mode, when it is desired to keep the in-focus state after coming into focus, setting the rotation operation of the focus ring 214 disabled prevents a change in the in-focus state due to unintended motion of the operation member caused by, for example, erroneous operation. However, the focus ring lock function may prevent not only a change in the in-focus state, but also a change in the focus lens position due to unintended motion of the operation member caused by, for example, erroneous operation by setting the rotation operation of the focus ring 214 disabled, when it is desired to temporarily fix the focus lens position after adjusting the focus position as in a case where coarse bokeh or graphic bokeh is captured with the focus position intentionally fixed in an out-of-focus state such as a case where illumination is captured.

In the above embodiments, the lens controller 240 in the interchangeable lens 200 receives the operation signal indicating the operation of the focus ring 214 and then controls the focus motor 233 to drive the focus lens 230. The camera controller 140 of the camera body 100 may control the driving of the focus lens 230 based on the operation of the focus ring 214. In this case, the camera controller 140 of the camera body 100 receives the operation signal indicating the operation of the focus ring 214 from the interchangeable lens 200 via the mounts 250, 150. The camera controller 140 generates a drive signal for the focus lens 230 based on the operation signal and transmits the drive signal to the interchangeable lens 200 via the mounts 250, 150. When the focus ring lock function is set to ON, the camera controller 140 may ignore the operation signal received from the interchangeable lens 200.

In the above embodiments, the focus ring has been given as an example of the operation member for operating the focus lens. However, the operation member may be a different kind of operation member such as a lever or a switch as long as the operation member is used to make an instruction for driving the focus lens.

In the above embodiments, the menu screen has been given as an example of the operation unit for setting the focus ring lock function enabled or disabled, but the operation unit is not limited to such a menu screen. The operation unit may be, for example, a physical switch, button, or dial disposed on the camera body 100.

In the above embodiments, the setting of the focus lens 230 whether the focusing lock function is enabled or disabled is made, but the present disclosure is not limited to such a configuration. The present disclosure may be applied to a setting of the zoom lens 210 whether a zoom adjustment lock function is enabled or disabled. Both the focus lens 230 and the zoom lens 210 are lenses whose focus position and zoom position can be adjusted via an adjustment of the position in the optical axis direction. Therefore, the setting of the focus lens 230 whether the focus ring lock function is enabled or disabled is applicable to the setting of the zoom lens 210 whether the zoom adjustment lock function is enabled or disabled.

In the above embodiments, the focus ring lock function is realized by ignoring the operation signal from the second detector 215, but the present disclosure is not limited to such a configuration. That is, instead of implementing the lock function electrically or via software, the lock function may be mechanically implemented. For example, a lock mechanism for preventing the focus lens 230 from moving in the optical axis direction may be provided. When the focus ring lock function is set enabled, the lock mechanism may lock the focus lens 230, and when the focus ring lock function is set disabled, the lock mechanism may unlock the focus lens 230.

In the above embodiments, the digital camera whose lens is interchangeable has been given as an example of the image capturing device, but the image capturing device may be a device in which a lens and a body integrated with each other.

Although the digital camera has been given as an example of the image capturing device, the idea of the present disclosure is applicable to other types of image capturing devices. That is, the idea of the present disclosure is applicable to an image capturing device including an operation member for adjusting the focus.

In the above embodiments, the CMOS image sensor has been given as an example of an image capturing unit, but the image capturing unit is not limited to such a CMOS image sensor. The image capturing unit may be a different type of image sensor such as a CCD image sensor or an NMOS image sensor.

The embodiments have been described above as examples of the technique according to the present disclosure. For the description, the accompanying drawings and the detailed description have been provided.

Consequently, the accompanying drawings and detailed description provided to illustrate the technique described above may include not only components that are essential for solving the problem but also components that are not essential for solving the problem. Thus, it should not be immediately deemed that, merely based on the fact that the components that are not essential are shown in the accompanying drawings and the detailed description, the components that are not essential are essential.

Further, since the above embodiments are provided to illustrate the technique according to the present disclosure, various changes, replacements, additions, omissions, or the like can be made within the scope of the claims or of their equivalents.

The present disclosure is useful for an image capturing device capable of adjusting the in-focus state via the operation member for operating the focus lens.

What is claimed is:

1. An image capturing device on which an interchangeable lens is mountable, the interchangeable lens including an optical axis direction position adjustment lens and an operation member to be operated by a user to drive the optical axis direction position adjustment lens, the image capturing device comprising:
   an acquisition unit that acquires an operation instruction corresponding to setting operation made by a user; and
   a controller that controls operation of the image capturing device,
   wherein
   the controller has a manual mode in which a position of the optical axis direction position adjustment lens is adjusted in accordance with operation of the operation member and an automatic mode in which the position of the optical axis direction position adjustment lens is automatically adjusted, and
   the controller sets a lock function enabled or disabled in accordance with the operation instruction from the user acquired by the acquisition unit, and the controller, with the lock function set enabled, prevents the optical axis direction position adjustment lens from being driven even when the user operates the operation member in the manual mode.

2. The image capturing device according to claim 1, wherein the controller transmits, to the interchangeable lens, a control signal for setting the lock function enabled or disabled in the interchangeable lens.

3. The image capturing device according to claim 1, wherein, when the lock function is set enabled, the interchangeable lens invalidates an operation signal corresponding to the operation of the operation member.

4. The image capturing device according to claim 1, further comprising a display that displays predetermined information indicating that the lock function is set enabled.

5. The image capturing device according to claim 1, wherein, when power to the image capturing device is turned on after the power to the image capturing device is turned off with the lock function set enabled, the controller controls the interchangeable lens to move the optical axis direction position adjustment lens to a position where the optical axis direction position adjustment lens is located just before the turning off of the power.

6. The image capturing device according to claim 1, wherein the optical axis direction position adjustment lens is a focus lens.

7. The image capturing device according to claim 1, wherein the acquisition unit is an operation unit on which the user makes the setting operation.

8. The image capturing device according to claim 1, wherein the operation unit includes a menu screen for setting the lock function.

9. The image capturing device according to claim 1, wherein the acquisition unit is a communication unit that receives the operation instruction from a remote controller or a mobile terminal on which the user makes the setting operation.

* * * * *